(12) United States Patent
Shieh et al.

(10) Patent No.: US 12,391,129 B2
(45) Date of Patent: Aug. 19, 2025

(54) VEHICLE MOTION CONTROL CONSIDERING DYNAMIC GEAR RATIO FOR MULTI-SPEED DRIVE SYSTEMS

(71) Applicant: GM Global Technology Operations LLC, Detroit, MI (US)

(72) Inventors: Su-Yang Shieh, Clawson, MI (US); Chunhao J. Lee, Troy, MI (US); Dongxu Li, Troy, MI (US); Paul Guillermo Otanez, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 337 days.

(21) Appl. No.: 18/080,248

(22) Filed: Dec. 13, 2022

(65) Prior Publication Data

US 2024/0190265 A1   Jun. 13, 2024

(51) Int. Cl.
*F16H 61/00* (2006.01)
*B60L 15/20* (2006.01)
*F16H 59/14* (2006.01)
*F16H 59/18* (2006.01)
(Continued)

(52) U.S. Cl.
CPC ........ *B60L 15/2054* (2013.01); *F16H 59/141* (2013.01); *F16H 59/18* (2013.01); *F16H 59/48* (2013.01); *F16H 61/0204* (2013.01); *B60L 2240/16* (2013.01); *B60L 2240/423* (2013.01); *B60L 2240/486* (2013.01);
(Continued)

(58) Field of Classification Search
CPC ............. B60L 15/2054; B60L 2240/16; B60L 2240/423; B60L 2240/486; B60L 2250/28; B60L 15/20; B60L 15/32; B60L 2240/14; F16H 59/141; F16H 59/18; F16H 59/48; F16H 61/0204; F16H 2059/148; F16H 2061/009; B60W 2050/0041; B60W 30/19; B60W 50/00; B60W 2050/0019; B60W 2710/083; B60W 2720/403; B60Y 2200/91
See application file for complete search history.

(56) References Cited

U.S. PATENT DOCUMENTS

| 7,212,898 B2 | 5/2007 | Whitton et al. |
| 7,853,386 B2 | 12/2010 | Heap |
| 9,796,372 B2 | 10/2017 | Choi et al. |

(Continued)

FOREIGN PATENT DOCUMENTS

| CN | 115107736 A | * | 9/2022 | .......... B60W 10/026 |
| EP | 3276227 A1 | * | 1/2018 | ............ B60W 10/04 |
| JP | 2019085002 A | * | 6/2019 | ............... B60K 6/48 |

OTHER PUBLICATIONS

German Office Action for German Application No. 102023122950.8; dated Apr. 9, 2025; 6 pages.

*Primary Examiner* — Justin Holmes
(74) *Attorney, Agent, or Firm* — CANTOR COLBURN LLP

(57) ABSTRACT

A vehicle includes a system and method of operating a gearbox of the vehicle. The vehicle includes an interface for entering a desired vehicle acceleration and a processor. The system includes a processor. The processor is configured to receive the desired vehicle acceleration, create an objective function that relates the desired vehicle acceleration to a torque, perform an optimization process on the objective function to determine the torque, and apply the torque to the vehicle to achieve the desired vehicle acceleration.

20 Claims, 5 Drawing Sheets

(51) Int. Cl.
*F16H 59/48* (2006.01)
*F16H 61/02* (2006.01)

(52) U.S. Cl.
CPC ..... *B60L 2250/28* (2013.01); *F16H 2059/148* (2013.01); *F16H 2061/009* (2013.01)

(56) References Cited

U.S. PATENT DOCUMENTS

| | | |
|---|---|---|
| 11,643,081 B2 | 5/2023 | Ravichandran et al. |
| 11,718,302 B2 * | 8/2023 | Mohr ................... B60W 30/19 477/111 |
| 2018/0257633 A1 * | 9/2018 | Meyer ................... B60W 10/06 |
| 2020/0276976 A1 * | 9/2020 | Cho ....................... B60W 10/06 |

* cited by examiner

VEHICLE MOTION CONTROL CONSIDERING DYNAMIC GEAR RATIO FOR MULTI-SPEED DRIVE SYSTEMS

INTRODUCTION

The subject disclosure relates to shifting gears in electric vehicles having a plurality of motors and, in particular, to a method of dynamically computing gear ratios to maintain a desired vehicle motion and distribution of motor torque across axles of the vehicle.

An electric vehicle can include multiple motors, including a rear motor for operating a rear axle of the electrical vehicle and a front motor for operating a front axle of the electrical vehicle. A vehicle motion controller can be used to control operating speeds, etc., of the motors. During a gear shift, the acceleration of the vehicle can change, leading to issues with the drivability of the vehicle during the gear shift. Accordingly, it is desirable to provide a system for operating a transmission so as to control the motion of the vehicle during a gear shift.

SUMMARY

In one exemplary embodiment, a method of operating a gearbox of a vehicle is disclosed. A desired vehicle acceleration is received at a processor. An objective function is created that relates the desired vehicle acceleration to a torque. An optimization process is performed on the objective function to determine the torque. The torque is applied to the vehicle to achieve the desired vehicle acceleration.

In addition to one or more of the features described herein, the objective function includes a kinematic equation of the gearbox, the kinematic equation relating the desired vehicle acceleration to an output torque of the gearbox. The torque includes one of the torque applied to an axle of the vehicle and a motor torque. The method further includes determining the motor torque during an inertia phase of a gear shift procedure. The kinematic equation further relates the output torque to a clutch torque. The method further includes maintaining at least one of a constant acceleration of the vehicle, and a constant torque ratio throughout a first gear, a torque phase, an inertia phase and a second gear of a gear shift operation. The method further includes applying a constraint to the optimization process, wherein the constraint is at least one of a kinematic equation for a phase of a gear shift operation, a vehicle dynamic equation, and a motor operating limit.

In another exemplary embodiment, a system for performing a gear shift at a vehicle is disclosed. The system includes a processor. The processor is configured to receive a desired vehicle acceleration, create an objective function that relates the desired vehicle acceleration to a torque, perform an optimization process on the objective function to determine the torque, and apply the torque to the vehicle to achieve the desired vehicle acceleration.

In addition to one or more of the features described herein, the objective function includes a kinematic equation of a gearbox, the kinematic equation relating the desired vehicle acceleration to an output torque of the gearbox. The torque includes one of the torque applied to an axle of the vehicle and a motor torque. The processor is further configured to determine the motor torque during an inertia phase of a gear shift procedure. The kinematic equation further relates the output torque to a clutch torque. The processor is further configured to maintain at least one of a constant acceleration of the vehicle and a constant torque ratio throughout a first gear, a torque phase, an inertia phase and a second gear of a gear shift operation. The processor is further configured to apply a constraint to the optimization process, wherein the constraint is at least one of a kinematic equation for a phase of a gear shift operation, a vehicle dynamic equation, and a motor operating limit.

In another exemplary embodiment, a vehicle is disclosed. The vehicle includes an interface for entering a desired vehicle acceleration and a processor. The processor is configured to receive the desired vehicle acceleration, create an objective function that relates the desired vehicle acceleration to a torque, perform an optimization process on the objective function to determine the torque, and apply the torque to the vehicle to achieve the desired vehicle acceleration.

In addition to one or more of the features described herein, the objective function includes a kinematic equation of a gearbox, the kinematic equation relating the desired vehicle acceleration to an output torque of the gearbox. The torque includes one of the torque applied to an axle of the vehicle and a motor torque. The processor is further configured to determine the motor torque during an inertia phase of a gear shift procedure. The kinematic equation further relates the output torque to a clutch torque. The processor is further configured to apply a constraint to the optimization process, wherein the constraint is at least one of a kinematic equation for a phase of a gear shift operation, a vehicle dynamic equation, and a motor operating limit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
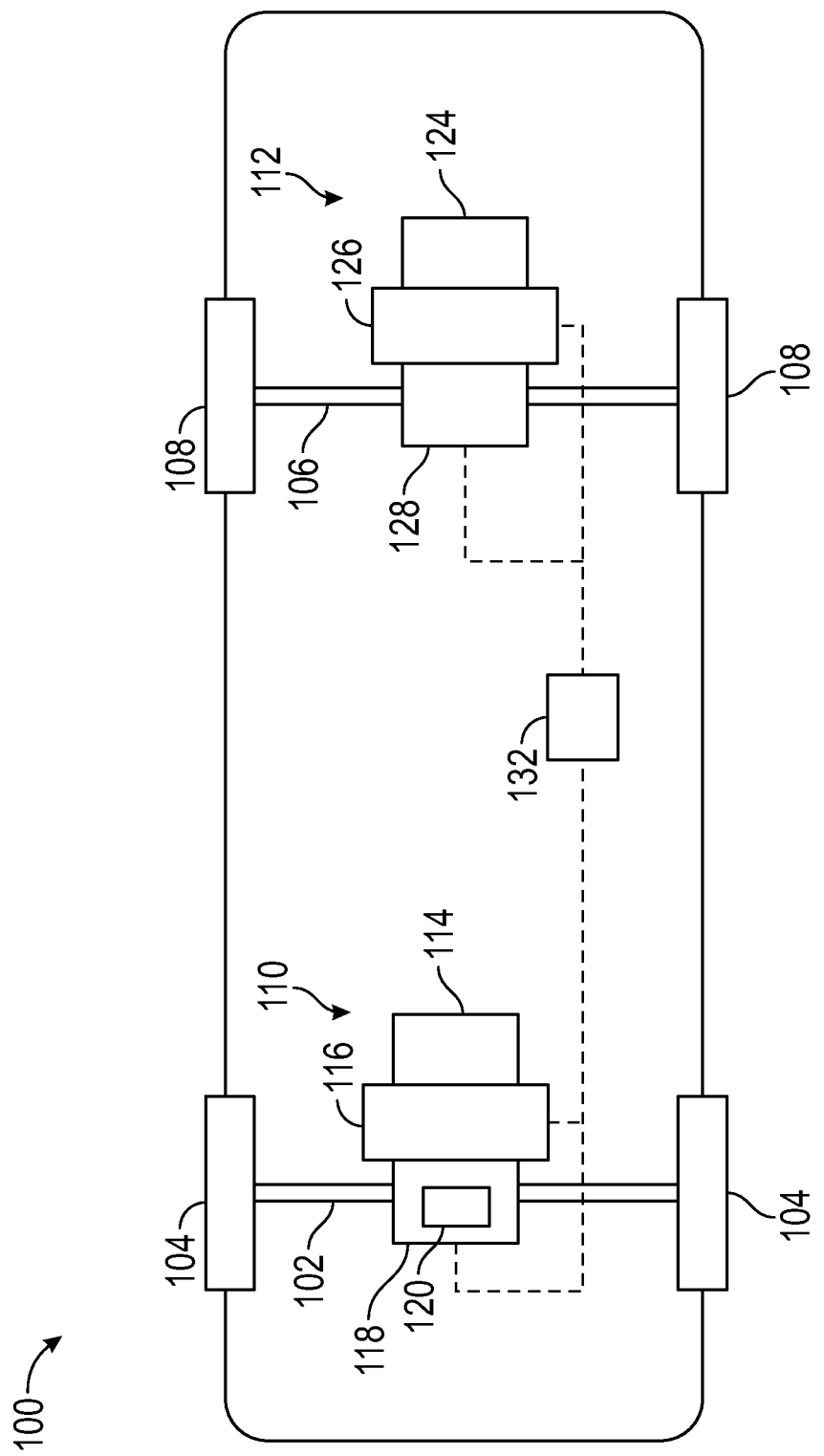
FIG. 1 shows a schematic diagram of an electric vehicle in a plan view, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a schematic diagram of an electric vehicle 100 in a plan view. The electric vehicle 100 can be a high voltage (HV) electric vehicle, such as an EV truck. The electric vehicle includes a first axle (rear axle 102) that connects rear wheels 104 and a second axle (front axle 106) that connects front wheels 108. A first drive system 110 provides power to the rear axle 102, and a second drive system 112 provides power to the front axle 106. The first drive system 110 can include a first battery (rear battery 114), first motor (rear motor 116), and a first transmission (rear transmission 118). The rear motor 116 is an electric motor that converts power from the rear battery 114 into kinetic energy in the form of a rotation. The rear transmission 118 can engage the rear motor 116 to transfer the rotation from the rear motor to the rear axle 102 and rear wheel 104. The rear transmission 118 can include a gearbox 120 that controls a gear ratio between the rear motor 116 and the rear axle 102.

The second drive system 112 can include a second battery (front battery 124), a second motor (front motor 126) and a second transmission (front transmission 128). Although a front gearbox is not shown in FIG. 2, the front transmission 128 can have a front gearbox in various embodiments. The front motor 126 is an electric motor that converts power from the front battery 124 into kinetic energy in the form of a rotation.

While the electric vehicle 100 of FIG. 1 shows two drive systems, it is understood that there can be additional drive systems for different embodiments of the vehicle. In various applications, the rear axle can have multiple drive systems and/or the front axle can have multiple drive systems. Additionally, the rear battery 114 and the front battery 124 can be replaced by a single battery that powers both the rear motor 116 and the front motor 126.

A controller 132 performs various operations to control operation of the first drive system 110, such as by controlling a gear shift operation of the gearbox 120 as well as a torque at the rear motor 116 or an output torque to be applied to the rear axle 102. The controller 132 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 132 may also include a non-transitory computer-readable medium that stores instructions which are processed by one or more processors of the controller to implement processes detailed herein.

Figure 2:
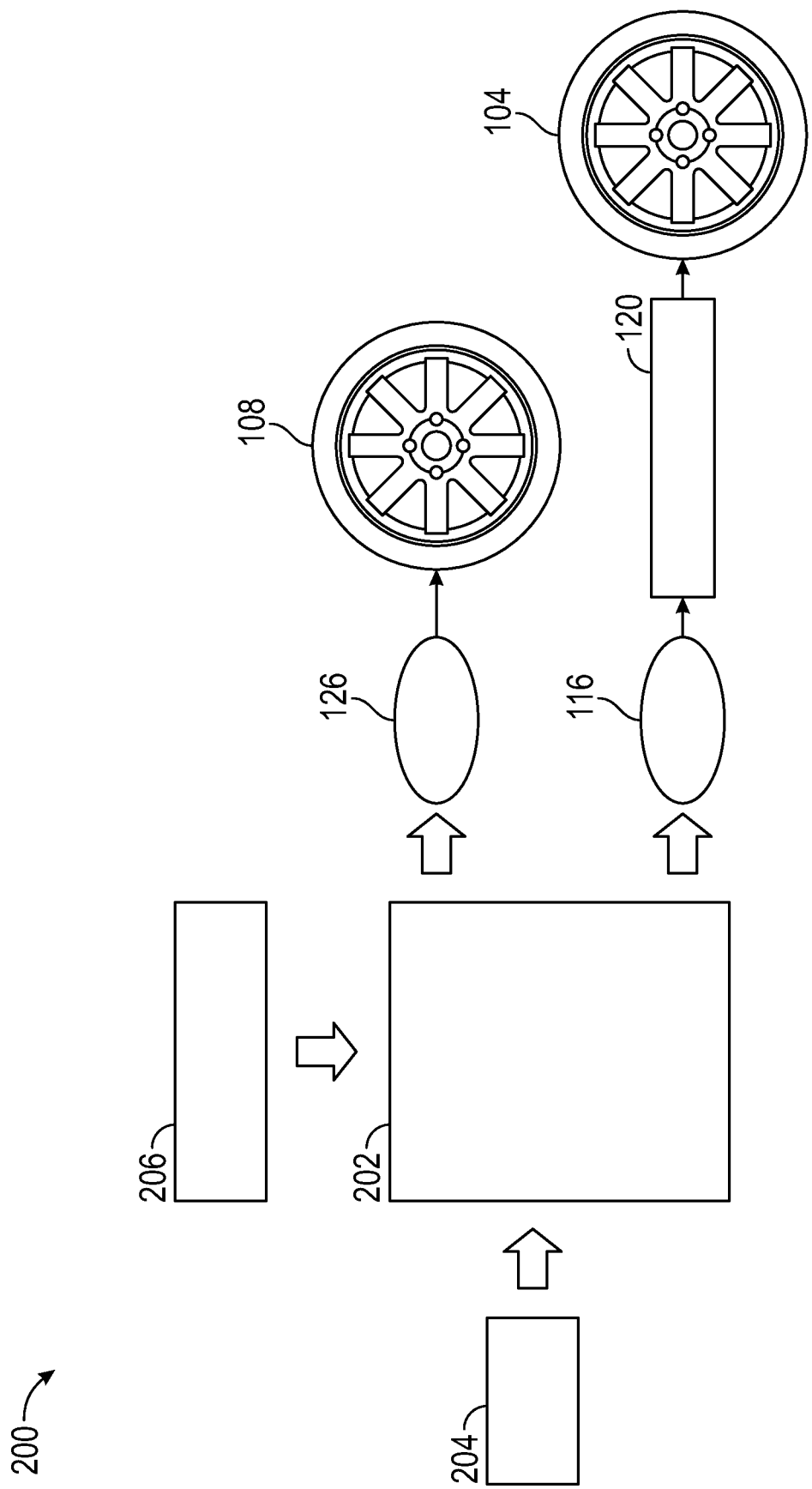
FIG. 2 shows a schematic diagram of a control system for the electric vehicle.

FIG. 2 shows a schematic diagram of a control system 200 for the electric vehicle 100. The control system 200 includes a vehicle motion controller 202 that operates at a processor of the electric vehicle 100. The vehicle motion controller 202 receives driver's input 204 from a driver interface, such as an acceleration pedal, a gear shift, a touchscreen, etc. The driver's input 204 can be an acceleration signal, a gear shift command, etc. The vehicle motion controller 202 receives a vehicle state 206 from one or more sensors of the electric vehicle 100. The vehicle state 206 can include data such as a current acceleration or velocity of the vehicle, various torques at the vehicle, an index of stability of the vehicle, and index of a responsiveness of the vehicle, a powertrain efficiency, etc.

The vehicle motion controller 202 determines various torques based on the driver's input and the vehicle states. In an embodiment, the vehicle motion controller 202 determines a motor torque for the rear motor 116 and a motor torque for the front motor 126 that maintains a constant acceleration at the vehicle during a gear shift operation at the gearbox 120. The vehicle motion controller 202 sends signals to the front motor 126 and the rear motor 116, as well as to the gearbox 120 to implement the various torques.

Figure 3:
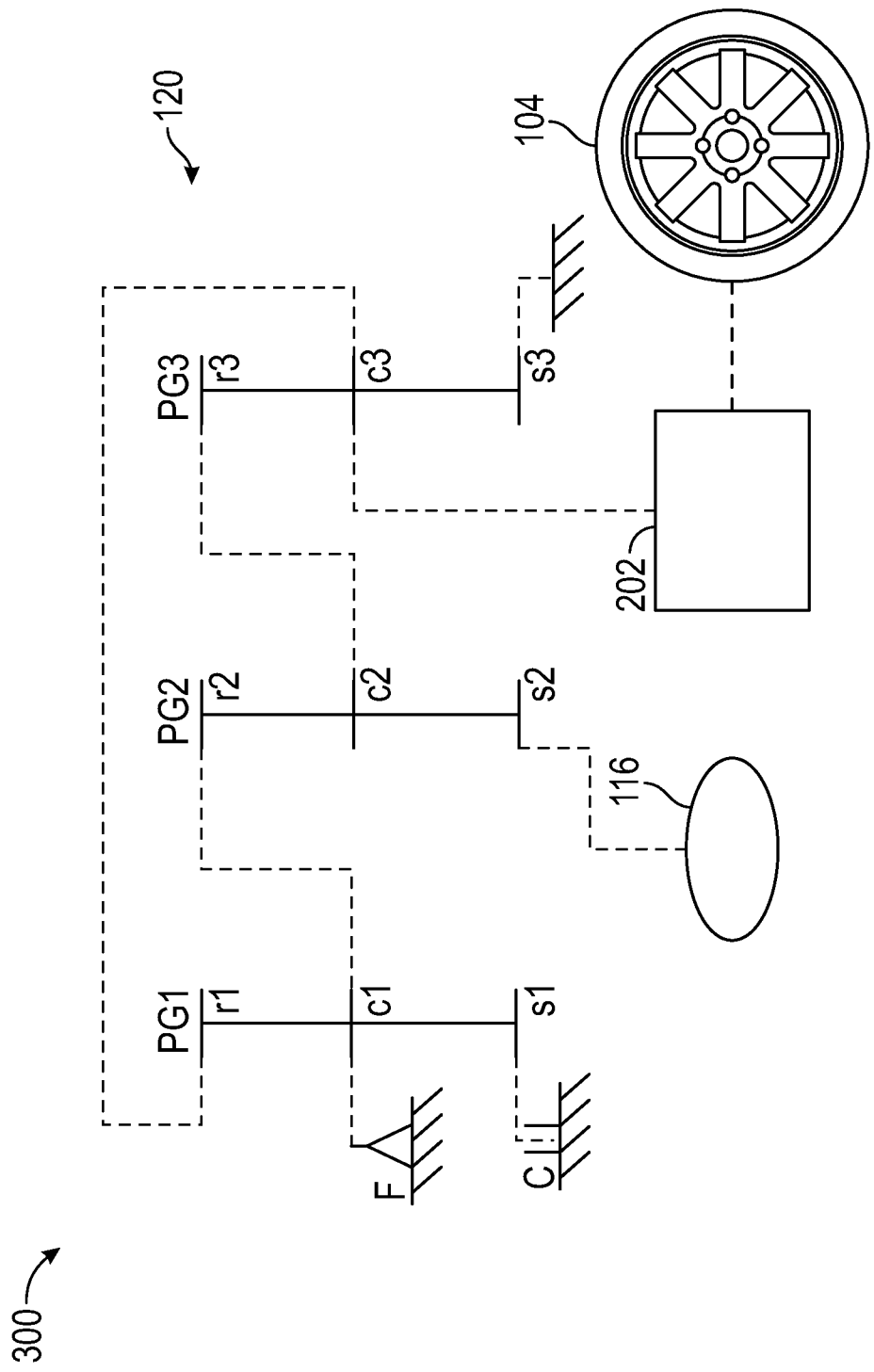
FIG. 3 shows a schematic diagram of a gearbox of the electric vehicle.

FIG. 3 shows a schematic diagram 300 of the gearbox 120. The gearbox 120 includes a first planetary gearset PG1, second planetary gearset PG2 and third planetary gearset PG3. The first planetary gearset PG1 includes a first sun gear S1, a first carrier gear C1, and a first ring gear R1. The second planetary gearset PG2 includes a second sun gear S2, a second carrier gear C2, and a second ring gear R2. The third planetary gearset PG3 includes a third sun gear S3, a third carrier gear C3, and a third ring gear R3.

The first carrier gear C1 is coupled to the second ring gear R2. The second carrier gear C2 is coupled to the third ring gear R3. The third carrier gear C3 is coupled to the first ring gear R1. The first carrier gear C1 is coupled to a first clutch (clutch F) which is a one-way clutch. The first sun gear S1 is coupled to a second clutch (clutch C).

The second sun gear S2 is coupled to the rear motor 116 and receives a motor torque from the rear motor. The third carrier gear C3 is coupled to an output system, which can include gears that transfers an output torque from the gearbox 120 to the rear axle 102 and rear wheel 104.

The gearbox 120 operates through four phases of the gear shift operation: a first gear phase, a torque phase, an inertia phase, and a second gear phase. In the first gear phase, the first clutch (clutch F) is engaged while the second clutch (clutch C) is disengaged. A torque from the rear motor 116 is transferred from the second planetary gear PG2 to the third planetary gear PG3 via coupling between the second carrier gear C2 and the third ring gear (R3). In the torque phase, the torque from the rear motor 16 is transferred from the first clutch (clutch F) to the second clutch (clutch C), making the first clutch an offgoing clutch and the second clutch an oncoming clutch. In the inertia phase, the applied force on the oncoming clutch (second clutch, clutch C) is increased. The rear motor torque is decreased, generally resulting in a decrease in the speed of the rear motor 116. When the transmission is in second gear, the second clutch (clutch C) is engaged, and the first clutch (clutch F) is disengaged. The torque from the rear motor is transferred from the second planetary gearset PG2 to the third planetary gearset PG3 via the first planetary gearset PG1.

Due to the different phase-related configurations for the gearbox 120, each phase of the gear shift operation is governed by a different set of kinematic equations. The vehicle motion controller 202 can solve these kinematic equations during the gear shift operation in order to maintain a desired vehicle motion throughout the gear shift, such as a constant acceleration and/or a constant torque ratio.

The vehicle motion controller 202 solves the kinematic equations using an optimization process. An objective function that is optimized using the optimization process is shown in Eq. (1):

$$\min_{\substack{T_{m,f,1}(t), T_{m,f,2}(t) \\ T_{m,r,1}(t), T_{m,r,2}(t)}} \int_{t_0}^{t_0+h} \{w_1 [a(t) - a_{des}(t)]^2 - w_2 f_{st}(t) - w_3 f_{rsp}(t) - w_4 \eta_{pt}(t)\} dt \quad \text{Eq. (1)}$$

where $T_{m,f,1}(t)$ is a torque at a first front motor, $T_{m,f,2}(t)$ is a torque at a second front motor, $T_{m,r,1}(t)$ is a torque at a first rear motor, $T_{m,r,2}(t)$ is a torque at a second rear motor, $a_{des}$ is a desired acceleration (from driver's input), $f_{st}$ is an index of vehicle stability, $f_{rsp}$ is an index of vehicle responsiveness, $\eta_{pt}$ is a powertrain efficiency and $w_i$ are weighting factors. An example of the index of vehicle stability is shown in Eq., (2):

$$f_{st} = -\beta_{sd}^2 \quad \text{Eq. (2)}$$

where $\beta_{sd}$ is a side slip angle. An exemplar of index of vehicle responsiveness (i.e., a remaining capacity of tire forces) is shown in Eq. (3):

$$f_{rsp} = \Sigma_{i=1}^{4}(\kappa_i - \kappa_c)^2 \qquad \text{Eq. (3)}$$

where $\kappa_i$ is a tire slip ratio for the $i^{th}$ wheel and $\kappa_c$ is a critical slip ratio beyond which a tire is unable to generate an effective tire force.

Each phase of the gear shift operation is described using a different kinematic equation. Kinematic equations that are relevant to each of the first gear phase, torque phase, inertia phase, and second gear phase and shown in Eqs. (4)-(7), respectively. Equations (4)-(7) describe constraints on the optimization problem in different phases of a great shift operations. Other constraints can include vehicle dynamics and motor operating limits. Through the optimization process, the vehicle motion controller 202 determines motor torques that minimize the objective function within a given time horizon $[t_0, t_0+h]$ while satisfying the transmission kinematic equation Eq. (4-7), vehicle dynamic equations, and/or various motor operating limits.

The vehicle motion controller 202 can solve each of the Equations (4)-(7) during the appropriate phase in order to determine a method of operating the rear transmission to achieve a desired output, such as a constant acceleration. The vehicle motion controller 202 solves an equation by performing an optimization procedure such as shown in Eq. (1).

Eq. (4) shows kinematic equations describing operation of the gearbox 120 when the gearbox is in first gear:

$$\begin{bmatrix} 1 & 0 & 0 & 0 & 0 & 0 \\ 0 & -(1+\beta_2) & 1 & 0 & 0 & 0 \\ 0 & 1 & 0 & 0 & 0 & 0 \\ -(1+\beta_1)I_{s1} & 0 & \beta_2 I_{in} & 0 & 1 & -\beta_2 \\ \beta_1 I_{s1} & 0 & 0 & (1+\beta_3) & 0 & 0 \\ 0 & I_{c2}+I_{r3} & (1+\beta_2)I_{in} & \beta_3 & 0 & -(1+\beta_2) \end{bmatrix} \quad \text{Eq. (4)}$$

$$\begin{bmatrix} \dot{\omega}_{s1} \\ \dot{\omega}_{c2} \\ \dot{\omega}_{in} \\ T_{s3} \\ T_F \\ T_{m,r} \end{bmatrix} = \begin{bmatrix} -\beta_1 \\ 0 \\ 1/\beta_3 + 1 \\ 0 \\ I_{out} \\ 0 \end{bmatrix} \dot{\omega}_{out} + \begin{bmatrix} 0 \\ 0 \\ 0 \\ 0 \\ 1 \\ 0 \end{bmatrix} T_{out}$$

Coefficients $\beta_1$, $\beta_2$ and $\beta_3$ are the ratios of the radius of the ring gear to a radius of the sun gear for respective planetary gearsets. For example, $\beta_1$ is the ratio of the radius of the first ring gear R1 to the radius of the first sun gear S1. The coefficient $I_n$ is the moment of inertia for the $n^{th}$ transmission component. Thus, $I_{S1}$ is the moment of inertia for the first sun gear S1. The coefficient $I_{in}$ is the torque from the moment of inertia for the rear motor. The coefficient $I_{out}$ is the moment of inertia of the axle and wheel. Angular acceleration $\dot{\omega}_{s1}$ is the angular acceleration of the first sun gear, $\dot{\omega}_{c2}$ is the angular acceleration of the second carrier gear, and $\dot{\omega}_{in}$ is the angular acceleration from the rear motor. Torque $T_{S3}$ is the torque at the third sun gear S3 and torque $T_F$ is the torque of clutch F. The torque $T_{m,r}$ is the torque of the rear motor. Torque $T_{out}$ is the torque output by the gearbox or the torque at the axle and wheel. The angular acceleration $\dot{\omega}_{s1}$ is an acceleration that is applied at the axles and wheel and is related to the acceleration of the vehicle.

The first three row of Eq. (4) are equations of motion, while the second three rows of Eq. (4) are torque equations. A desired output angular acceleration $\dot{\omega}_{out}$ (which is related to a desired vehicle acceleration of the vehicle), and a desired output torque $T_{out}$ are input to Eq. (4), which is then solved using the optimization procedure to determine a rear motor torque $T_{m,r}$. The rear motor torque is shown at the bottom row of the column vector on the left-hand side of Eq. (4).

Eq. (5) shows kinematic equations describing operation of the gearbox 120 during the torque phase:

$$\begin{bmatrix} 1 & 0 & 0 & 0 & 0 & 0 \\ 0 & -(1+\beta_2) & 1 & 0 & 0 & 0 \\ 0 & 1 & 0 & 0 & 0 & 0 \\ -(1+\beta_1)I_{s1} & 0 & \beta_2 I_{in} & 0 & 1 & -\beta_2 \\ \beta_1 I_{s1} & 0 & 0 & (1+\beta_3) & 0 & 0 \\ 0 & I_{c2}+I_{r3} & (1+\beta_2)I_{in} & \beta_3 & 0 & -(1+\beta_2) \end{bmatrix} \quad \text{Eq. (5)}$$

$$\begin{bmatrix} \dot{\omega}_{s1} \\ \dot{\omega}_{c2} \\ \dot{\omega}_{in} \\ T_{s3} \\ T_F \\ T_{m,r} \end{bmatrix} = \begin{bmatrix} -\beta_1 \\ 0 \\ 1/\beta_3 + 1 \\ 0 \\ I_{out} \\ 0 \end{bmatrix} \dot{\omega}_{out} + \begin{bmatrix} 0 \\ 0 \\ 0 \\ 0 \\ 1 \\ 0 \end{bmatrix} T_{out} + \begin{bmatrix} 0 \\ 0 \\ 0 \\ -(1+\beta_1) \\ \beta_1 \\ 0 \end{bmatrix} T_c$$

For the torque phase, the desired output angular acceleration $\dot{\omega}_{out}$, desired output torque $T_{out}$ and the clutch torque of the second clutch (clutch C) are entered into Eq. (5). Eq. (5) is then solved using an optimization procedure to the rear motor torque $T_{m,r}$ (bottom row of the column vector on the left-hand side of Eq. (5)).

Eq. (6) shows the kinematic equations for the inertia phase of the gear shift operation:

$$\begin{bmatrix} 1 & 0 & 0 & 0 & -(1+\beta_1) & 0 \\ 0 & -(1+\beta_2) & 1 & 0 & \beta_2 & 0 \\ 0 & 1 & 0 & 0 & 0 & 0 \\ -(1+\beta_1)I_{s1} & 0 & \beta_2 I_{in} & 0 & -(I_{c1}+I_{r2}) & 0 \\ \beta_1 I_{s1} & 0 & 0 & (1+\beta_3) & 0 & -1 \\ 0 & I_{c2}+I_{r3} & (1+\beta_2)I_{in} & \beta_3 & 0 & 0 \end{bmatrix} \quad \text{Eq. (6)}$$

$$\begin{bmatrix} \dot{\omega}_{s1} \\ \dot{\omega}_{c2} \\ \dot{\omega}_{in} \\ T_{s3} \\ \dot{\omega}_{c1} \\ T_{out} \end{bmatrix} = \begin{bmatrix} -\beta_1 \\ 0 \\ 1/\beta_3 + 1 \\ 0 \\ I_{out} \\ 0 \end{bmatrix} \dot{\omega}_{out} + \begin{bmatrix} 0 \\ 0 \\ 0 \\ \beta_2 \\ 0 \\ 1+\beta_2 \end{bmatrix} T_{m,r} + \begin{bmatrix} 0 \\ 0 \\ 0 \\ -(1+\beta_1) \\ \beta_1 \\ 0 \end{bmatrix} T_c$$

For Eq. (6), the input variables are the desired output angular acceleration $\dot{\omega}_{out}$, the rear motor torque $T_{m,r}$ and the clutch torque for the clutch C. The solution of Eq. (6) provides the output torque $T_{out}$ that is applied to the rear axles (bottom row of the column vector on the left-hand side of Eq. (6)).

Eq. (7) shows kinematic equation for the gearbox in second gear:

$$\begin{bmatrix} 0 & 0 & 0 & 0 & (1+\beta_1) & 0 \\ 0 & -(1+\beta_2) & 1 & 0 & \beta_2 & 0 \\ 0 & 1 & 0 & 0 & 0 & 0 \\ -(1+\beta_1) & 0 & \beta_2 I_{in} & 0 & -(I_{c1}+I_{r2}) & -\beta_2 \\ \beta_1 & 0 & 0 & (1+\beta_3) & 0 & 0 \\ 0 & I_{c2}+I_{r3} & (1+\beta_2)I_{in} & \beta_3 & 0 & -(1+\beta_2) \end{bmatrix}$$

Eq. (7)

$$\begin{bmatrix} T_c \\ \dot\omega_{c2} \\ \dot\omega_{in} \\ T_{s3} \\ \dot\omega_{c1} \\ T_{m,r} \end{bmatrix} = \begin{bmatrix} \beta_1 \\ 0 \\ 1/\beta_3+1 \\ 0 \\ I_{out} \\ 0 \end{bmatrix} \dot\omega_{out} + \begin{bmatrix} 0 \\ 0 \\ 0 \\ 0 \\ 1 \\ 0 \end{bmatrix} T_{out}$$

For Eq. (7), the input variables are the desired output angular acceleration $\dot\omega_{out}$, and the output torque $T_{out}$. The solution of Eq. (6) provides the rear motor torque that can be applied to the rear motor (bottom row of the column vector on the left-hand side of Eq. (7)).

Figure 4:
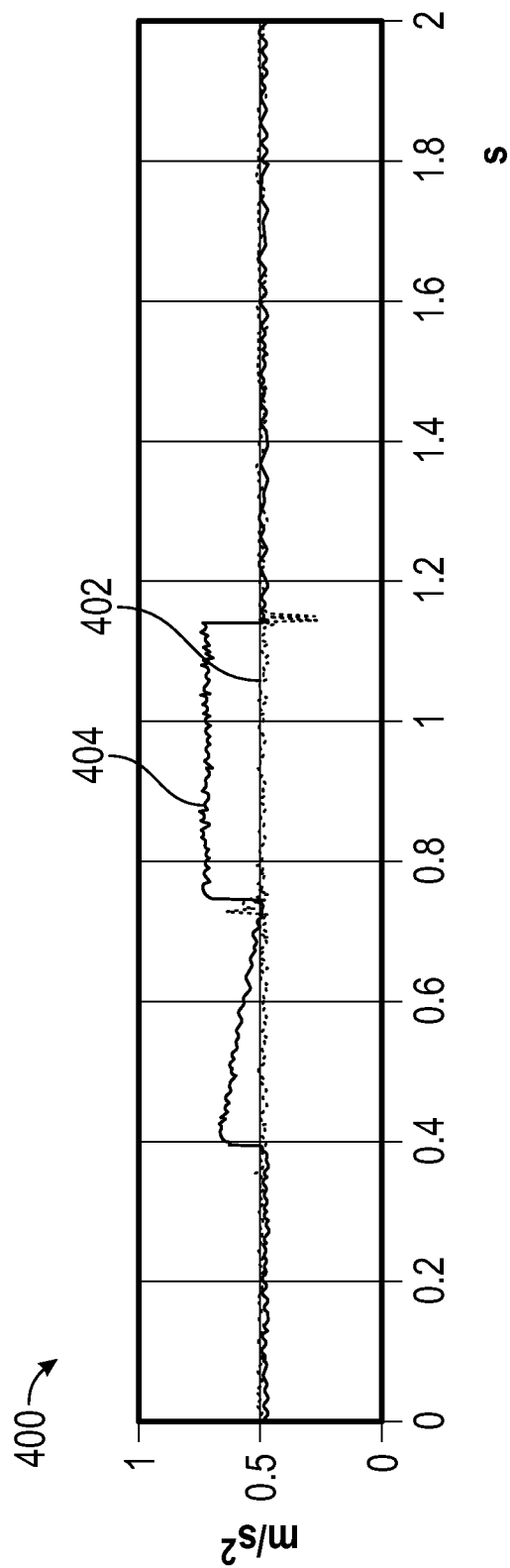
FIG. 4 shows a timeline illustrating acceleration during a gear shift operation from a first gear to a second gear.

FIG. 4 shows a timeline 400 illustrating acceleration during a gear shift operation from a first gear to a second gear. For the gear shift operation shown in FIG. 4, the goal is to maintain a constant vehicle acceleration of 0.5 meters/second^2 (m/s$^2$) and to distribute the driving torque evenly to the front axle and the rear axle. Time is shown along the abscissa in seconds and vehicle acceleration is shown along the ordinate axis in m/s$^2$. The gearbox is in the first gear up until t=0.4 seconds. Between t=0.4 seconds and about t=0.75 seconds, the gearbox is in the torque phase. Between t=0.75 seconds to about t=1.15 seconds, the gearbox is in the inertia phase. After about t=1.15 seconds, the gearbox is in second gear. Line 402 shows the acceleration of the vehicle during all phases of the gear shift. As illustrated, the acceleration maintains a constant value of about a=0.5 m/s$^2$ throughout the phases of the gear shift operation. Line 404 shows a baseline static case (not using the methods disclosed herein) in which acceleration fluctuates during the torque phase (from about t=0.4 seconds to about t−0.75 seconds), as well as during the inertia phase (from about t=0.75 seconds to about 1.15 seconds).

Figure 5:
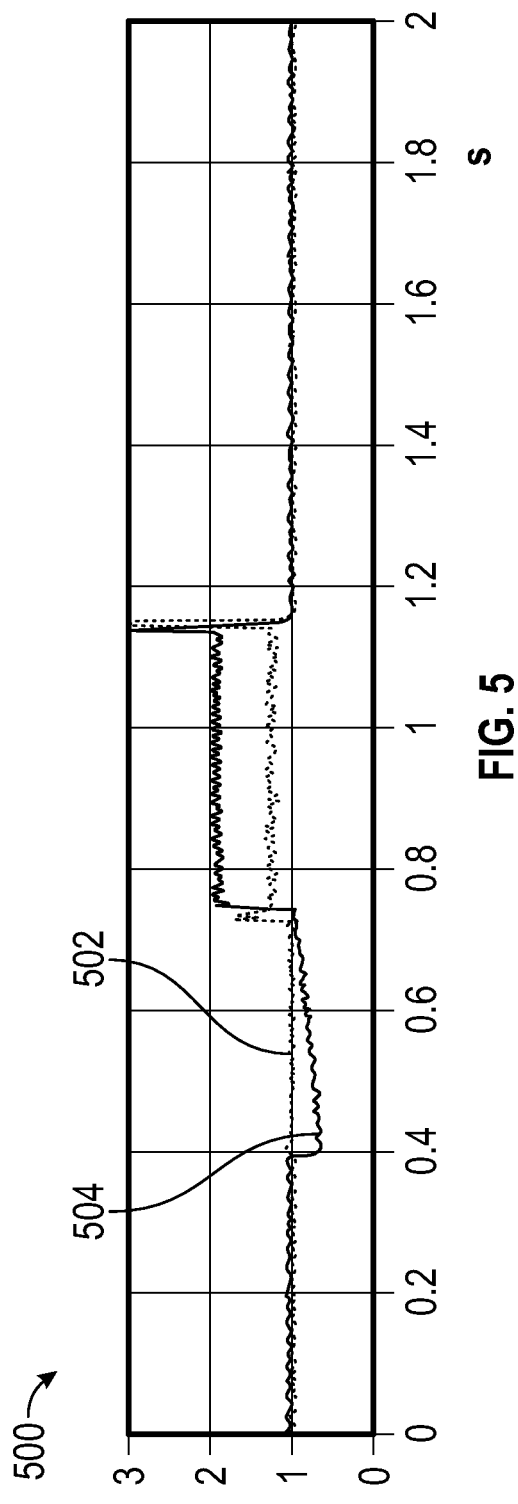
FIG. 5 shows a timeline illustrating axle torque ratio during the gear shift operation.

FIG. 5 shows a timeline 500 illustrating axle torque ratio during the gear shift operation. Time is shown along the abscissa in seconds and torque ratio is shown along the ordinate axis. Line 502 shows the torque ratio during all phases of the gear shift. Line 504 shows a baseline static case (not using the methods disclosed herein). For the baseline static case, the torque ratio can be as high as 2, which is far from the goal of distributing the torques evenly to the front axle and rear axles. Using the methods disclosed herein, the vehicle motion controller 202 is able to maintain torque ratio at about unity throughout the gear shift operation.

Figure 6:
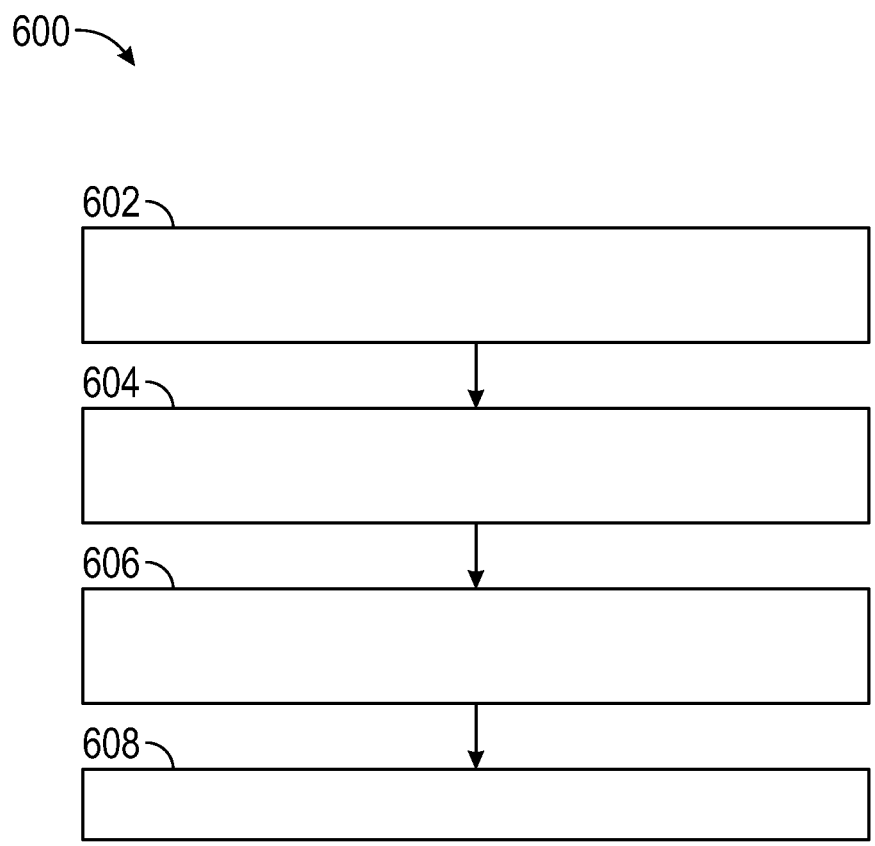
FIG. 6 show a flowchart for operation of the gearbox.

FIG. 6 show a flowchart 600 for operation of the gearbox. In box 602, an input parameter is received, which can include a desired vehicle acceleration In box 604 the input parameter is used to set up an objective function. In box 606, the objective function is optimized to determine a relevant torque. In box 608, the relevant torque is applied at the electric vehicle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a gearbox of a vehicle, comprising:
receiving a desired vehicle acceleration at a processor;
creating an objective function that relates the desired vehicle acceleration to a torque, wherein the objective function is:

$$\min_{\substack{T_{m,f,1}(t),T_{m,f,2}(t) \\ T_{m,r,1}(t),T_{m,r,2}(t)}} \int_{t_0}^{t_0+h} \{w_1[a(t)-a_{des}(t)]^2 - w_2 f_{st}(t) - w_3 f_{rsp}(t) - w_4 \eta_{pt}(t)\} dt$$

where $T_{m,f,1}(t)$ is the torque at a first front motor, $T_{m,f,2}(t)$ is the torque at a second front motor, $T_{m,r,1}(t)$ is the torque at a first rear motor, $T_{m,r,2}(t)$ is the torque at a second rear motor, $a_{des}$ is a desired acceleration, $f_{st}$ is an index of vehicle stability, $f_{rsp}$ is an index of vehicle responsiveness, $\eta_{pt}$ is a powertrain efficiency and $w_i$ are weighting factors;
optimizing the objective function to determine the torque that minimizes the objective function; and
applying the torque to the vehicle to achieve the desired vehicle acceleration.

2. The method of claim 1, wherein the objective function includes a kinematic equation of the gearbox, the kinematic equation relating the desired vehicle acceleration to an output torque of the gearbox.

3. The method of claim 2, wherein the kinematic equation further relates the output torque to a clutch torque.

4. The method of claim 1, wherein the torque includes one of: (i) the torque applied to an axle of the vehicle; and (ii) a motor torque.

5. The method of claim 4, further comprising determining the motor torque during an inertia phase of a gear shift procedure.

6. The method of claim 1, further comprising maintaining at least one of: (i) a constant acceleration of the vehicle; and (ii) a constant torque ratio throughout a first gear, a torque phase, an inertia phase and a second gear of a gear shift operation.

7. The method of claim 1, further comprising applying a constraint to the optimization process, wherein the constraint is at least one of: (i) a kinematic equation for a phase of a gear shift operation; (ii) a vehicle dynamic equation; and (iii) a motor operating limit.

8. A system for performing a gear shift at a vehicle, comprising:
a processor configured to:
receive a desired vehicle acceleration;
create an objective function that relates the desired vehicle acceleration to a torque, wherein the objective function is:

$$\min_{\substack{T_{m,f,1}(t),T_{m,f,2}(t) \\ T_{m,r,1}(t),T_{m,r,2}(t)}} \int_{t_0}^{t_0+h} \{w_1[a(t)-a_{des}(t)]^2 - w_2 f_{st}(t) - w_3 f_{rsp}(t) - w_4 \eta_{pt}(t)\}dt$$

where $T_{m,f,1}(t)$ is the torque at a first front motor, $T_{m,f,2}(t)$ is the torque at a second front motor, $T_{m,r,1}(t)$ is the torque at a first rear motor, $T_{m,r,2}(t)$ is the torque at a second rear motor, $a_{des}$ is a desired acceleration, $f_{st}$ is an index of vehicle stability, $f_{rsp}$ is an index of vehicle responsiveness, $\eta_{pt}$ is a powertrain efficiency and $w_i$ are weighting factors;
optimize the objective function to determine the torque that minimizes the objective function; and
apply the torque to the vehicle to achieve the desired vehicle acceleration.

9. The system of claim 8, wherein the objective function includes a kinematic equation of a gearbox, the kinematic equation relating the desired vehicle acceleration to an output torque of the gearbox.

10. The system of claim 9, wherein the kinematic equation further relates the output torque to a clutch torque.

11. The system of claim 8, wherein the torque includes one of: (i) the torque applied to an axle of the vehicle; and (ii) a motor torque.

12. The system of claim 11, wherein the processor is further configured to determine the motor torque during an inertia phase of a gear shift procedure.

13. The system of claim 8, wherein the processor is further configured to maintain at least one of: (i) a constant acceleration of the vehicle; and (ii) a constant torque ratio throughout a first gear, a torque phase, an inertia phase and a second gear of a gear shift operation.

14. The system of claim 8, wherein the processor is further configured to apply a constraint to the optimization process, wherein the constraint is at least one of: (i) a kinematic equation for a phase of a gear shift operation; (ii) a vehicle dynamic equation; and
(iii) a motor operating limit.

15. A vehicle, comprising:
an interface for entering a desired vehicle acceleration; and
a processor configured to:
receive the desired vehicle acceleration;
create an objective function that relates the desired vehicle acceleration to a torque, wherein the objective function is:

$$\min_{\substack{T_{m,f,1}(t),T_{m,f,2}(t) \\ T_{m,r,1}(t),T_{m,r,2}(t)}} \int_{t_0}^{t_0+h} \{w_1[a(t)-a_{des}(t)]^2 - w_2 f_{st}(t) - w_3 f_{rsp}(t) - w_4 \eta_{pt}(t)\}dt$$

where $T_{m,f,1}(t)$ is the torque at a first front motor, $T_{m,f,2}(t)$ is the torque at a second front motor, $T_{m,r,1}(t)$ is the torque at a first rear motor, $T_{m,r,2}(t)$ is the torque at a second rear motor, $a_{des}$ is a desired acceleration, $f_{st}$ is an index of vehicle stability, $f_{rsp}$ is an index of vehicle responsiveness, $\eta_{pt}$ is a powertrain efficiency and $w_i$ are weighting factors;
optimize the objective function to determine the torque that minimizes the objective function; and
apply the torque to the vehicle to achieve the desired vehicle acceleration.

16. The vehicle of claim 15, wherein the objective function includes a kinematic equation of a gearbox, the kinematic equation relating the desired vehicle acceleration to an output torque of the gearbox.

17. The vehicle of claim 16, wherein the kinematic equation further relates the output torque to a clutch torque.

18. The vehicle of claim 15, wherein the torque includes one of: (i) the torque applied to an axle of the vehicle; and (ii) a motor torque.

19. The vehicle of claim 18, wherein the processor is further configured to determine the motor torque during an inertia phase of a gear shift procedure.

20. The vehicle of claim 15, wherein the processor is further configured to apply a constraint to the optimization process, wherein the constraint is at least one of: (i) a kinematic equation for a phase of a gear shift operation; (ii) a vehicle dynamic equation; and (iii) a motor operating limit.

* * * * *